United States Patent
Sartor

(10) Patent No.: US 10,366,241 B2
(45) Date of Patent: Jul. 30, 2019

(54) SYSTEMS AND METHODS FOR ANALYZING, ASSESSING AND CONTROLLING TRUST AND AUTHENTICATION IN APPLICATIONS AND DEVICES

(71) Applicant: The Privacy Factor, LLC, Princeton Junction, NJ (US)

(72) Inventor: Mark A. Sartor, Princeton Junction, NJ (US)

(73) Assignee: The Privacy Factor, LLC, Princeton Junction, NJ (US)

(*) Notice: Subject to any disclaimer, the term of this patent is extended or adjusted under 35 U.S.C. 154(b) by 140 days.

(21) Appl. No.: 15/474,831

(22) Filed: Mar. 30, 2017

(65) Prior Publication Data

US 2017/0286700 A1    Oct. 5, 2017

Related U.S. Application Data

(60) Provisional application No. 62/315,538, filed on Mar. 30, 2016.

(51) Int. Cl.
*G06F 21/60* (2013.01)
*G06F 21/44* (2013.01)
(Continued)

(52) U.S. Cl.
CPC ............ *G06F 21/604* (2013.01); *G06F 21/44* (2013.01); *G06F 21/45* (2013.01); *G06F 21/577* (2013.01);
(Continued)

(58) Field of Classification Search
CPC . H04L 63/08; H04L 63/0815; H04L 63/0807; H04L 63/105; H04L 63/0823; H04L 63/0876; H04L 9/32; H04L 9/3226
See application file for complete search history.

(56) References Cited

U.S. PATENT DOCUMENTS 8,918,632 B1* 12/2014 Sartor .................... G06F 21/53
713/152
9,473,535 B2  10/2016 Sartor
(Continued)

OTHER PUBLICATIONS

International Application No. PCT/US2017/025145, International Search Report and Written Opinion dated Jun. 16, 2017.

*Primary Examiner* — Tae K Kim
(74) *Attorney, Agent, or Firm* — Sheppard, Mullin, Richter & Hampton LLP

(57) ABSTRACT

Systems and methods for receiving a request to analyze trust of a client system and perform actions based on a client trust profile. A trust rating server device receives a request from a client computing device to analyze the trust on the device. The request identifies at least one credential or certificate installed on the device for example. The credential or certificate is obtained and analyzed to identify key information that relates to trust, such as level of encryption, country or entity of origin, duration of credential, certifying authority, etc. A rating is established using the key information and compared to a profile or other metric. One or more credentials or certifications may be blocked, disabled, enabled or removed based on a user's profile. Trust credentials are continuously monitored on the device for changes, and new credentials are blocked that do not meet thresholds established in the user's profile.

19 Claims, 8 Drawing Sheets

(51) Int. Cl.
 *G06F 21/45* (2013.01)
 *G06F 21/57* (2013.01)
 *H04L 29/06* (2006.01)

(52) U.S. Cl.
 CPC .. *H04L 63/0823* (2013.01); *G06F 2221/2101* (2013.01); *H04L 63/20* (2013.01)

(56) References Cited

U.S. PATENT DOCUMENTS

| | | |
|---|---|---|
| 2002/0016777 A1 | 2/2002 | Seamons |
| 2002/0144149 A1* | 10/2002 | Hanna ................ H04L 9/3263 726/5 |
| 2004/0210771 A1 | 10/2004 | Wood |
| 2005/0172117 A1* | 8/2005 | Aura ................ H04L 63/0823 713/155 |
| 2009/0204471 A1 | 8/2009 | Elenbaas |
| 2011/0137789 A1 | 6/2011 | Kortina |
| 2011/0185401 A1* | 7/2011 | Bak ................ G06F 17/30958 726/5 |
| 2012/0221859 A1* | 8/2012 | Marien ................ G06F 21/34 713/172 |
| 2013/0198519 A1* | 8/2013 | Marien ................ G06F 21/34 713/172 |
| 2014/0068272 A1* | 3/2014 | Savtchenko ........ H04L 9/3226 713/185 |
| 2015/0128236 A1* | 5/2015 | Moscicki ............ H04L 63/0876 726/7 |
| 2015/0180867 A1* | 6/2015 | Perez ................ H04L 63/0876 726/6 |
| 2015/0207819 A1* | 7/2015 | Sartor ................ G06F 21/53 726/1 |
| 2016/0110528 A1* | 4/2016 | Gupta ................ G06F 21/31 726/19 |
| 2016/0127341 A1* | 5/2016 | Yan ................ H04L 63/0407 726/9 |

* cited by examiner

SYSTEMS AND METHODS FOR ANALYZING, ASSESSING AND CONTROLLING TRUST AND AUTHENTICATION IN APPLICATIONS AND DEVICES

CROSS-REFERENCE TO RELATED APPLICATIONS

The present application claims the benefit of U.S. Provisional Patent Application Ser. No. 62/315,538, filed Mar. 30, 2016 and entitled "Systems for and Methods for Analyzing, Assessing and Controlling Trust and Authentication in Applications and Devices," which is hereby incorporated by reference herein.

TECHNICAL FIELD

This disclosure relates to approaches for assessing and controlling trust and authentication in applications and devices. More specifically, this disclosure relates to analyzing trust of credentials (e.g., digital certificates) and client systems (e.g., computers, mobile devices).

DESCRIPTION OF RELATED ART

In the internet and mobile device age, technology and its implications on user privacy and security are progressing faster than the user's ability to monitor its impact. Users often implicitly trust their devices. However, recent events have shown that such trust may not be warranted or even advisable. For example, certificate authorities from different entities or countries may use low levels of encryption, and in some cases the associated certificates that established authentication were faked. Further, some may be from countries whose governments are involved in cyber spying.

Accordingly, there is an increased need for applications that can help users attain additional control and understanding of their devices and applications as they relate to trust.

SUMMARY

Various embodiments of the present disclosure include systems, methods, and non-transitory computer readable media configured to receive a request to analyze trust of a client system. A set of credentials installed on the client system is identified based on the request. For at least one credential of the set of credentials, it is determined whether the credential has a previously generated credential trust rating, and if at least a determination is made that the credential does not have a previously generated credential trust rating, then one or more credential parameters of the credential are identified, and a new credential trust rating for the credential is generated based on a respective level of trust risk associated with each or a group of respective credential parameters of the one or more credential parameters. If at least a determination is made that the credential has a previously generated trust rating, then the previously generated credential trust rating is retrieved from a datastore. An aggregate credential trust rating is generated based on any of the new credential trust ratings and the previously generated credential ratings for the set of credentials installed on the client system.

In some embodiments, the one or more credential parameters includes any of an encryption level, history of adverse events associated with the credential, or history of adverse events associated with issuer of the credential.

In some embodiments, the systems, methods, and non-transitory computer readable media further comprise determining a client system trust rating of the client system based on the aggregate credential trust rating; comparing the aggregate credential trust rating with a threshold value; and performing one or more trust actions based on the comparison. In related embodiments, the one or more trust actions include any of generating an alert indicating client system trust rating, removing at least one credential of the set of credentials, disabling at least one credential of the set of credentials, or disabling one or more applications using credentials that do not meet the trust criteria.

In some embodiments, the systems, methods, and non-transitory computer readable media further comprise comparing each of the credential trust ratings with a threshold value; and performing one or more trust actions based on the comparison. In related embodiments, the one or more trust actions include any of generating an alert indicating at least one of the credential trust ratings, removing at least one credential of the set of credentials, disabling at least one credential of the set of credentials, or disabling one or more applications using credentials that do not meet the trust criteria.

In some embodiments, the systems, methods, and non-transitory computer readable media further comprise detecting a trigger event, intercepting the trigger event, identifying a second set of credentials associated with the trigger event, and for at least one credential of the second set of credentials, determine whether the credential has a previously generated credential trust rating. If at least a determination is made that the credential does not have a previously generated credential trust rating, then one or more credential parameters of the credential are identified, and a new credential trust rating is generated for the credential based on a respective level of trust risk associated with each respective credential parameter of the one or more credential parameters. If at least a determination is made that the credential has a previously generated trust rating, then the previously generated credential trust rating for the credential is retrieved from a datastore. An aggregate credential trust rating is generated based on any of the new credential trust ratings and the previously generated credential ratings for the set of credentials installed on the client system. A trust action is performed based on the aggregate credential trust rating. In related embodiments, the trigger event comprises a request to install an application or credential on the client system, and the trust action comprises blocking the request to install the application or credential on the client system or allowing the request to install the application on the client system.

In some embodiments, the aggregate credential trust rating is generated based on a trust profile.

In some embodiments, the systems, methods, and non-transitory computer readable media further comprise generating a second aggregate credential trust rating for a second set of credentials installed on a second client system; generating a user trust rating based on the first aggregate credential trust rating and the second aggregate trust rating; and performing a trust action based on the user trust rating.

In some embodiments, the systems, methods, and non-transitory computer readable media further comprise detecting a change to one or more credentials of the set of credentials; and generating an alert indicating the change to the one or more credentials of the set of credentials. The alert to change may be positive or negative . . . e.g., the encryption could get better, i.e., based on the trust profile, the trust rating improves.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

In some embodiments, systems and methods establish or apply a trust metric or rating; scan a device for trust-related items; assess and/or intercept application installation based on metrics related to trust; analyze application access (e.g., permissions) and use; monitor trust-related items for modification; visualize or display data in a simple and easy to understand manner; facilitate removal, disabling, or blocking of objectionable trust-related items, e.g., based on user preferences or other criteria; and/or allowing trust-related items, e.g., based on user preferences or other criteria.

The area of trust and authentication is typically not well understood by the casual technology user, who may generally assume that their device will simply take care of this for them, and that the internet community will help ensure trust is warranted. However, the level of encryption used by a given entity (as reported in their certificate for example) may differ significantly—some are unacceptably low. And, these may also change, for example when software is updated on the device. The information contained in the certificates is cryptic and difficult for anyone not involved in cryptography or information science to understand. In many cases, devices are sold to users with hundreds of pre-installed trust certificates or other credentials that will automatically allow an application to install or website to load if it uses one of these certificates, and the user simply trusts that these certificates support their interests. Even further, some applications (or web sites) install their own certificates, with the customary "OK" or "agree" checkbox presented to the user to accept it. Further, these certificates may be modified and/or installed without a user ever being made aware. While most devices allow the user to obtain a cryptic list of certificates and their contents, and in some cases manually disable them one by one, there is no means to evaluate whether they should be enabled or disabled, or to easily view/understand what is in the certificate and take action. Further, there may be no way for the user to monitor the certificates for changes or additions, or to determine which applications use which certificates.

Figure 1:
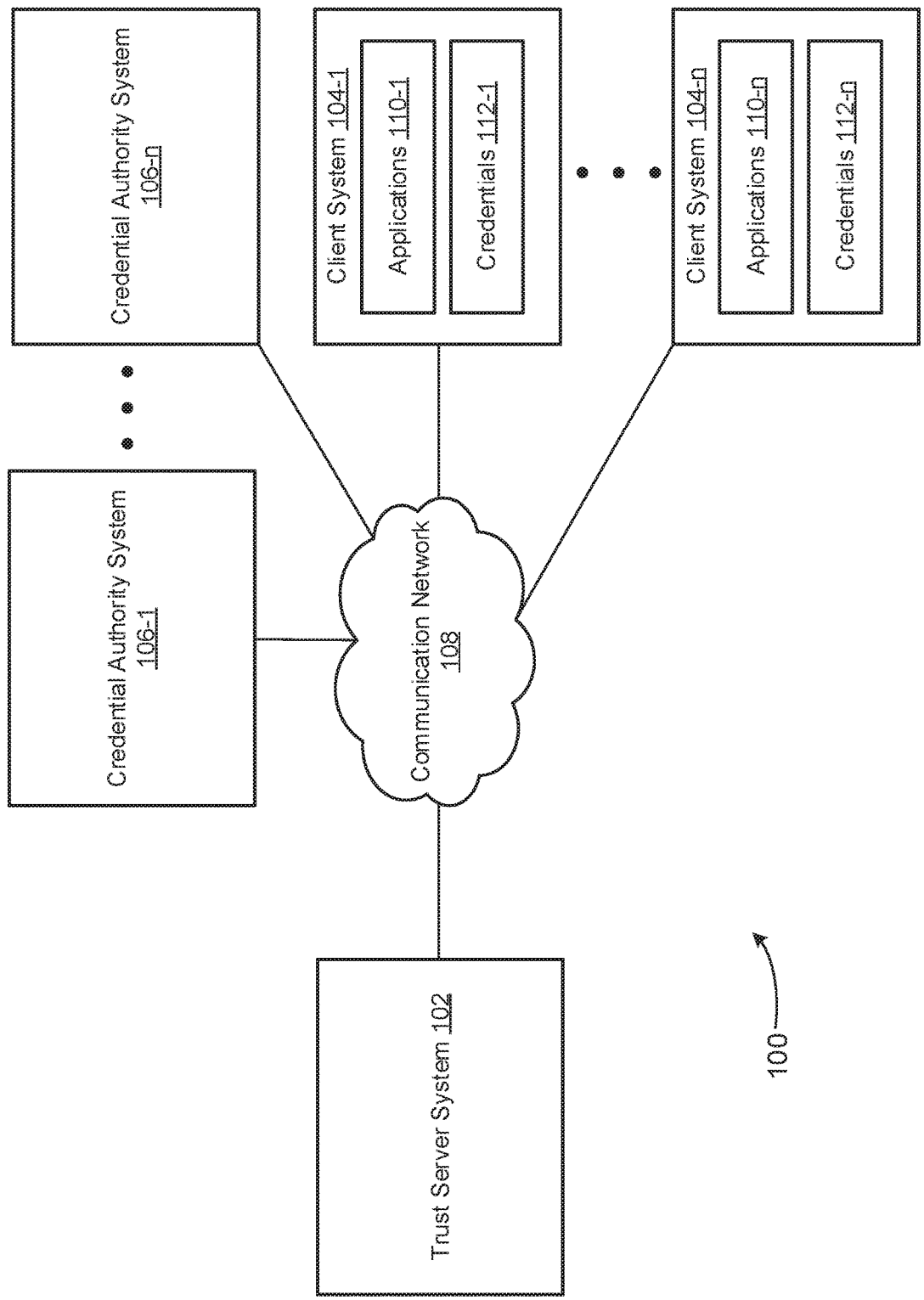
FIG. 1 depicts a diagram of an example of a system for analyzing, assessing and controlling trust of one or more client systems or of a user according to some embodiments.

FIG. 1 depicts a diagram of an example of a system 100 for analyzing, assessing and controlling trust of one or more client systems or of a user (or group of users) according to some embodiments. The example system 100 shown in FIG. 1 includes a trust server system 102, client systems 104-1 to 104-n (individually, the client system 104, collectively, the client systems 104), credential authority systems 106-1 to 106-n (individually, the credential authority system 106, collectively, the credential authority systems 106), and a communication network 108.

The trust server system 102 may function to generate trust ratings for credentials and generate aggregate trust ratings for devices based on the aggregate rating of trust credentials on a device. As used herein, credentials may include digital certificates, identity certificates, public key certificates, security tokens, and/or the like. Credentials may be issued by credential authority systems, and may be used to create secure connections between client systems and remote server systems. In some embodiments, trust ratings for credentials may be generated based on credential parameters, such as an encryption level of a credential, a credential authority system that issued a credential, a company, country or geographic region associated with a credential or a credential authority, a history of a credential and/or a credential authority, and/or the like. For example, histories may include events (e.g., adverse events such as hacking or other security compromises, updates/revisions changing level of protection, etc.) associated with a particular credential or credential authority. In various embodiments, the functionality of the trust server system 102 may be performed by one or more servers, workstations, desktop computers, laptop computers, mobile devices (e.g., smartphone or tablet computer), and/or other computing devices.

In some embodiments, the trust server system 102 functions to generate trust ratings of clients systems. For example, the trust server system 102 may generate a score or other metric indicating a level of trust of a client system or group of client systems based on credential ratings of one or more credentials installed on the on the client system or group of client systems and/or aggregate credential ratings. In various embodiments, the trust server system 102 may generate trust ratings of client systems or group of client systems based on trust ratings of credentials installed on the clients systems and one or more privacy ratings associated with the client systems. For example, the trust server system 102 may determine privacy ratings, e.g., as described in U.S. Pat. No. 9,473,535, the entirety of which is incorporated by reference herein, or obtain privacy ratings from a remote system (e.g., a privacy analyzing server, as described in U.S. Pat. No. 9,473,535). For example, the trust server system 102 may be more concerned if the application had a low trust rating and had highly sensitive permissions on the device (e.g., a low privacy factor). The group of client systems may pertain to an individual user, an enterprise, a community, an event, and/or the like.

In some embodiments, the trust server system 102 functions to intercept and/or block requests. Requests may include, for example, request to install applications or credentials on client system. The trust server system 102 may intercept some or all requests associated with a client system and block particular intercepted requests based on trust ratings of one or more credentials associated with the request. For example, a client system may request to download and install an application, and the application may require one or more credentials to be installed on the client system. The trust server system 102 may intercept and/or block the download or installation of the application, and/or block the download and/or installation of the one or more required credentials. In some embodiments, the trust server system 102 may request user approval before allowing a download or installation. In some embodiments, the trust server system 102 may send an alert after the download or installation to inform the user of the risk. Other responses are also possible.

The client systems 104 may function to store, install and execute applications 110 (e.g., mobile applications, virtualized applications, local applications, and/or remote applications), store and install credentials 112, present graphical user interfaces (GUIs), receive user inputs, and communicate with remote systems. For example, functionality of the client systems 104 may be performed by one or more mobile devices (e.g., smartphones, cell phones, smartwatches, tablet computers, and/or the like), desktop computers, laptop computers, workstations, servers, cars, televisions, refrigerators, HVAC, Bluetooth devices, wearables, hearing aids, and/or the like. In some embodiments, the client systems 104 may include some or all of the functionality of the trust server system 102. For example, the client systems 104 may generate trust ratings of credentials 112, generate trust ratings of client systems 104, a user or a group of users, and intercept, allow and/or block installation of applications 110 and credentials 112. In other embodiments, the client systems 104 may cooperate with a remote system (e.g., trust server system 102) to perform such functionality. For example, client systems 104 may intercept a request to install a set of credentials 112, provide the credentials 112 to the remote system for trust analysis, and block or allow the installation based on the trust analysis.

The credential authority systems 106 may function to issue credentials. For example, functionality of the credential authority systems 106 may be performed by one or more servers or other computing devices. In some embodiments, the credential authority systems function as a trusted third-party between an owner of the credential and the client system using the credential. The credential authority systems 106 may be geographically disperse, and reside in various different countries.

The communication network 108 may represent one or more computer networks (e.g., LAN, WAN, and/or the like) or other transmission mediums. The communication network 108 may provide communication between the trust server system 102, client systems 104, credential authority systems 106, and/or other systems described herein. In some embodiments, the communication network 108 comprises one or more computing devices, routers, cables, buses, and/or other network topologies (e.g., mesh, hub-and-spoke, and/or the like). In some embodiments, the communication network 108 may be wired and/or wireless. In various embodiments, the communication network 108 may comprise the Internet, one or more wide area networks (WANs) or local area networks (LANs), one or more networks that may be public, private, IP-based, non-IP based, and so forth.

Figure 2:
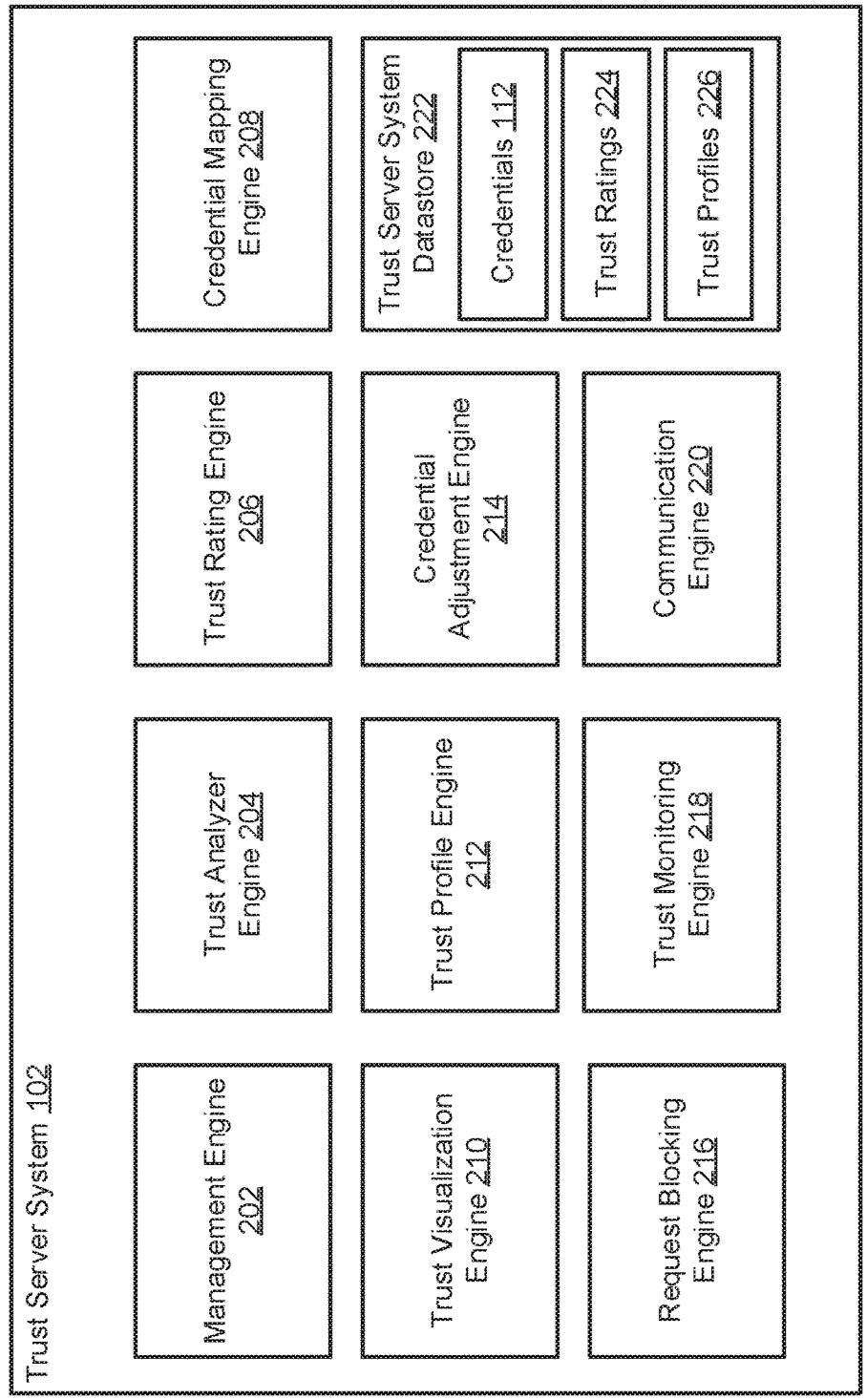
FIG. 2 depicts a diagram of an example of a trust server system according to some embodiments.

FIG. 2 depicts a diagram 200 of an example of a trust server system 102 according to some embodiments. The trust server system 102 includes a management engine 202, a trust analyzer engine 204, a trust rating engine 206, a credential mapping engine 208, a trust visualization engine 210, a trust profile engine 212, a credential adjustment engine 214, a request blocking engine 216, a trust monitoring engine 218, a communication engine 220, and a trust server system datastore 222.

The management engine 202 may function to manage (e.g., create, read, update, delete, or otherwise access) credentials 112, trust ratings 224, and trust profiles 226. The management engine 202 may perform any of these operations manually (e.g., by a user interacting with a GUI) and/or automatically (e.g., triggered by one or more of the engines 204-220, discussed below). In some embodiments, the management engine 202 comprises a library of executable instructions, which are executable by a processor for performing any of the aforementioned management operations.

The trust analyzer engine 204 may function to perform a trust analysis (or "scan") of credentials 112, client systems, a user, a group of users, etc. In some embodiments, the trust analyzer engine 204 identifies and/or obtains a set of one or more credentials 112 installed on a client system or group of client systems, and identifies credential information (or, parameters) included within, or otherwise associated with, the credentials 112. For example, the credential information may include an encryption level of a credential, a credential authority that issued a credential, a country or geographic region associated with a credential or a credential authority, a history of a credential and/or a credential authority, and/or the like. For example, histories may include adverse events associated with a particular credential or credential authority or changes in levels of protection (e.g., encryption).

In some embodiments, the trust analyzer engine 204 may condition credential information for display, visualization, or generating trust ratings 224 of credentials 112, client systems, a user, a group of users, etc. Conditioning may include translating industry standard abbreviations, phrases and associated data into simple wording, or graphs, and/or aggregating information. For sake of illustrative clarity, "credential information" or "credential parameters," as used herein, may refer to raw credential information and/or conditioned credential information. In some embodiments, the conditioned credential information may be provided to requesting client systems, e.g., for display to a user or generating trust ratings.

The trust rating engine 206 may function to generate trust ratings 224 of credentials 112 (or, "credential trust ratings"), trust ratings 224 of client systems (or, "client system trust ratings"), trust ratings 224 for a user (or, "user trust ratings"), and/or trust ratings 224 for a group of users (or, "user group trust ratings"). In some embodiments, the trust rating engine 206 analyzes credential information and assigns a credential parameter rating 224 to one or more of the credential parameters, and generates a credential trust rating for each individual credential, and may also aggregate the credential trust ratings from one or more credentials 112. Credential trust ratings, client system trust ratings, user trust ratings, user group trust ratings, and/or the like may be provided to requesting client systems.

In some embodiments, the trust rating engine 206 functions to generate a trust rating 224 for a group of client systems associated with a user or other entity (or, "user trust rating"). For example, a user trust rating 224 may be generated based on an aggregate of the client system trust ratings associated with a particular user or group of users. The particular group of users may pertain to an enterprise, community, family, and/or the like.

The credential mapping engine 208 may function to determine a mapping or other connection between an application 110 or website and one or more credentials 112 used by the application 110 or website. For example, the credential mapping engine 206 may identify one or more particular applications 110 from credential information, generate a corresponding map, store the map, and/or present the map to a user via graphic or visualization display.

The trust visualization engine 210 may function to present visualizations of credential information. Visualization may include displaying credential information in a manner that enables simple interpretation by users who are not skilled in cryptography or information science. In some embodiments, the trust visualization engine 210 may generate a geographic map, and highlight or otherwise indicate countries or regions associated with credentials 112 installed on a client system. Selecting (e.g., clicking or hovering over) an indicated country or region may provide further details, e.g., the credentials and issuing credential authorities associated with that region that are installed on the client system.

The trust profile engine 212 may function to establish trust profiles 226. A trust profile 226 may represent a level of trust acceptable to a client system, user, group of users, or devices, etc. Trust profiles 226 may be created manually, e.g., by a user interacting with a GUI, or automatically, e.g., using machine learning. Trust profiles 226 may include some or all of the following:

Profile Identifier: identifies a trust profile.

Client System Identifier: identifies one or more client systems associated with the trust profile.

Trust Monitoring Policy: identifies events (e.g., application installation or update, credential installation, and/or the like) that may trigger a trust analysis (or, scan) or other trust action, and/or identifies a schedule (e.g., hourly, daily, weekly, monthly, annually, on-demand, and/or the like) for performing a trust analysis and/or other trust action.

Credential Trust Rating Threshold: indicates an allowable credential trust rating threshold. For example, if a credential has a credential trust rating that violates the threshold (e.g., a credential trust rating above or below the threshold), the trust server system 102 may block installation of the credential, remove the credential if already installed, alert the user, disable the application, etc.

Client System Trust Rating Threshold: indicates an allowable client system trust rating threshold. For example, if installing or updating a credential would result violate the allowable trust rating threshold (e.g., bring the client system trust rating above or below the threshold), the trust server system 102 may block the installation or change, alert the user to the installation or change, etc.

The credential adjustment engine 214 may function to determine which, if any, credentials 112 installed on a client system (or each client system of a group of client systems) should be enabled, disabled, and/or or removed. For example, the determination may be based on an associated trust profile 226. The credential adjustment engine 214 may further enable, disable, and/or remove one or more credentials 112 based on the determination.

The request blocking engine 216 may function to intercept and/or block a request associated with a client system. For example, the request blocking engine 216 may identify a set of credentials 112 associated with an application 110 that is pending installation or an application 110 whose credential is being changed (e.g., updated). The request blocking engine 216 may determine which if any of the credentials 112 should be blocked from installation or change based on credential trust ratings associated with the set of credentials 112 and/or a trust profile 226. For example, the trust profile 226 may indicate a threshold trust value, and the request blocking engine 216 may compare particular credential trust ratings or an aggregate trust rating with the threshold value to determine whether to allow or block installation and/or the change or update.

The trust monitoring engine 218 may function to monitor credentials 112 and/or client systems. For example, the trust monitoring engine 218 may monitor credentials 112 installed on a client system or group of client systems to determine whether any credentials 112 have been changed. In some embodiments, the trust monitoring engine 218 may determine a type of credential modification (e.g., modified by a local application, a third-party application, a third-party entity, an unknown entity, and/or the like). The trust monitoring engine 218 may trigger the credential adjustment engine 216 in response to detecting a modification. For example, the trust monitoring engine 218 may trigger the credential adjustment engine 216 to disable or remove some or all modified credentials, or only modified credentials of particular type (e.g., credentials modified by an unknown entity) and may trigger the disabling of previously installed applications if there previously installed credentials have been modified.

In some embodiments, the trust monitoring engine 218 may periodically analyze or scan client systems to determine installed credentials, modifications to installed credentials, and/or the like. In some embodiments, the trust monitoring engine 218 may conduct a scan each time the operating system on the client device is updated. Scans may be performed based on a trust monitoring policy of a trust profile 226. Scan results may be displayed to a user, stored (e.g., in datastore 222), and/or provided to a remote system for storage and archiving.

The communication engine 220 may function to send requests, transmit and, receive communications, and/or otherwise provide communication with one or a plurality of systems. In some embodiments, the communication engine 220 functions to encrypt and decrypt communications. The communication engine 220 may function to send requests to and receive data from a system through a network or a portion of a network. Depending upon implementation-specific or other considerations, the communication engine 220 may send requests and receive data through a connection, all or a portion of which may be a wireless connection. The communication engine 220 may request and receive messages, and/or other communications from associated systems.

The trust server system datastore 222 may function to store, at least temporarily, credentials 112, trust ratings 224, and trust profiles 226. In some embodiments, the credentials 112, the trust ratings 224, and/or the trust profiles 224 may be obtained locally and/or from a remote system (e.g., a client system 104).

Figure 3:
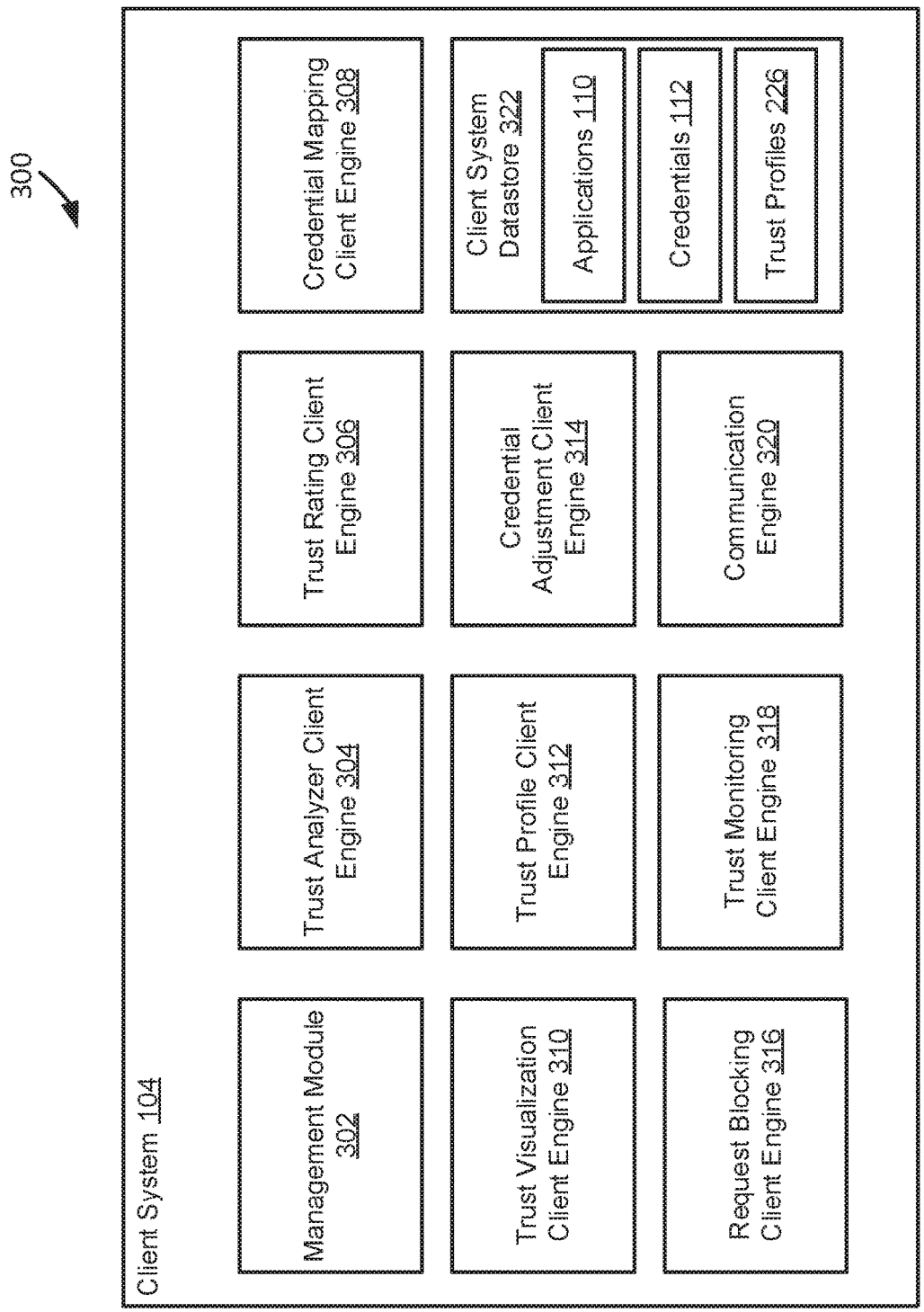
FIG. 3 depicts a diagram of an example of a client system according to some embodiments.

FIG. 3 depicts a diagram 300 of an example of a client system 104 according to some embodiments. The client system 104 includes a management engine 302, a trust analyzer client engine 304, a trust rating client engine 306, a credential mapping client engine 308, a trust visualization client engine 310, a trust profile client engine 312, a credential adjustment client engine 314, a request blocking client engine 316, a trust monitoring client engine 318, a communication engine 320, and a client system datastore 322.

The management engine 302 may function to manage (e.g., create, read, update, delete, or otherwise access) applications 110, credentials 112, and trust profiles 226 stored in the client system datastore 322. The management engine 302 may perform any of these operations manually (e.g., by a user interacting with a GUI), automatically (e.g., triggered by one or more of the engines 304-320, discussed below), or both. In some embodiments, the management engine 302 comprises a library of executable instructions, which are executable by a processor for performing any of the aforementioned management operations.

In some embodiments, the trust analyzer client engine 304 may function to cooperate with a remote system (e.g., trust server system 102) to perform a trust analysis of credentials 112 installed on the client system and perform a trust analysis of the client system 104. For example, the trust analyzer client engine 304 may identify a set of one or more credentials 112 installed on or being updated by the client system 104 (or group of client systems 104), provide the credentials 112 to the remote system for trust analysis, and receive the trust analysis from the remote system. In other embodiments, the trust analyzer engine 304 may function independently, e.g., without requiring interaction with a trust server system and/or other remote system. For example, the trust analyzer client engine 304 may include some or all of the functionality of the trust analyzer engine 204.

The trust rating client engine 306 may function to cooperate with a remote system (e.g., trust server system 102) to generate credential trust ratings and client system trust ratings. For example, the trust rating client engine 306 may identify credential information of one or more credentials 112, provide the credential information to the remote system for trust analysis, and receive the credential rating from the remote system. In other embodiments, the trust rating client engine 306 may function independently, e.g., without requiring interaction with a trust server system and/or other remote system. For example, the trust rating client engine 306 may include some or all of the functionality of the trust analyzer engine 204.

The credential mapping client engine 308 may function to cooperate with a remote system (e.g., trust server system 102) to determine a mapping or other connection between an application or web site and one or more credentials 112 used by the application. For example, the credential mapping client engine 308 may identify the applications and credentials 112, provide the applications and credentials 112 to the remote system for mapping, and receive the mapping from the remote system. In other embodiments, the credential mapping client engine 308 may function independently, e.g., without requiring interaction with a trust server system and/or other remote system. For example, the credential mapping client engine 308 may include some or all of the functionality of the credential mapping engine 208.

The trust visualization client engine 310 may function to cooperate with a remote system (e.g., trust server system 102) to present visualizations or display of credential information or conditioned credential information. For example, the trust visualization client engine 310 may identify credential information for visualization, provide the credential information to the remote system for visualization, and receive the visualization from the remote system. In other embodiments, the trust visualization client engine 310 may function independently, e.g., without requiring interaction with a trust server system and/or other remote system. For example, the trust visualization client engine 310 may include some or all of the functionality of the trust visualization engine 210.

The trust profile client engine 312 may function to cooperate with a remote system (e.g., trust server system 102) to perform establish trust profiles 226. For example, the trust profile client engine 312 may receive user input for creating the trust profile 226, provide the user input to the remote system for generating the trust profile 226, and receive trust profile 226 from the remote system. In other embodiments, the trust profile client engine 312 may function independently, e.g., without requiring interaction with a trust server system and/or other remote system. For example, the trust profile client engine 312 may include some or all of the functionality of the trust profile engine 212.

The credential adjustment client engine 314 may function to cooperate with a remote system (e.g., trust server system 102) to determine which, if any, credentials installed on a client system 104 or group of client systems 104 should be allowed, enabled, disabled, and/or removed. For example, the credential adjustment client engine 314 may receive instructions from the remote system indicating credentials 112 and/or applications to disable and/or remove. In other embodiments, the credential adjustment client engine 314 may function independently, e.g., without requiring interaction with a trust server system and/or other remote system. For example, the credential adjustment client engine 314 may include some or all of the functionality of the credential adjustment engine 214.

The request blocking client engine 316 may function to cooperate with a remote system (e.g., trust server system 102) to intercept and/or block a request associated with a client system 104. For example, the request blocking client engine 316 may receive instructions from the remote system indicating requests to intercept, block, and/or allow. In other embodiments, the request blocking client engine 316 may function independently, e.g., without requiring interaction with a trust server system and/or other remote system. For example, the request blocking client engine 316 may include some or all of the functionality of the request blocking engine 216.

The trust monitoring client engine 318 may function to cooperate with a remote system (e.g., trust server system 102) to monitor credentials and/or client systems, e.g., for changes. For example, the trust monitoring client engine 318 may receive instructions from the remote system indicating credentials 112 to monitor. In other embodiments, the trust monitoring client engine 318 may function independently, e.g., without requiring interaction with a trust server system and/or other remote system. For example, the trust monitoring client engine 318 may include some or all of the functionality of the trust monitoring engine 318.

The communication engine 320 may function to send requests, transmit and, receive communications, and/or otherwise provide communication with one or a plurality of systems. In some embodiments, the communication engine 320 functions to encrypt and decrypt communications. The communication engine 320 may function to send requests to and receive data from a system through a network or a portion of a network. Depending upon implementation-specific or other considerations, the communication engine 320 may send requests and receive data through a connection, all or a portion of which may be a wireless connection. The communication engine 320 may request and receive messages, and/or other communications from associated systems.

The client system datastore 322 may function to store, at least temporarily, applications 110, credentials 112, and trust profiles 226. For example, the credentials 112 and the trust profiles 226 may be obtained from a remote system (e.g., credential authority systems 106 and trust server system 102, respectively). Trust ratings 224 may be stored for access during a trust scan.

Figure 4:
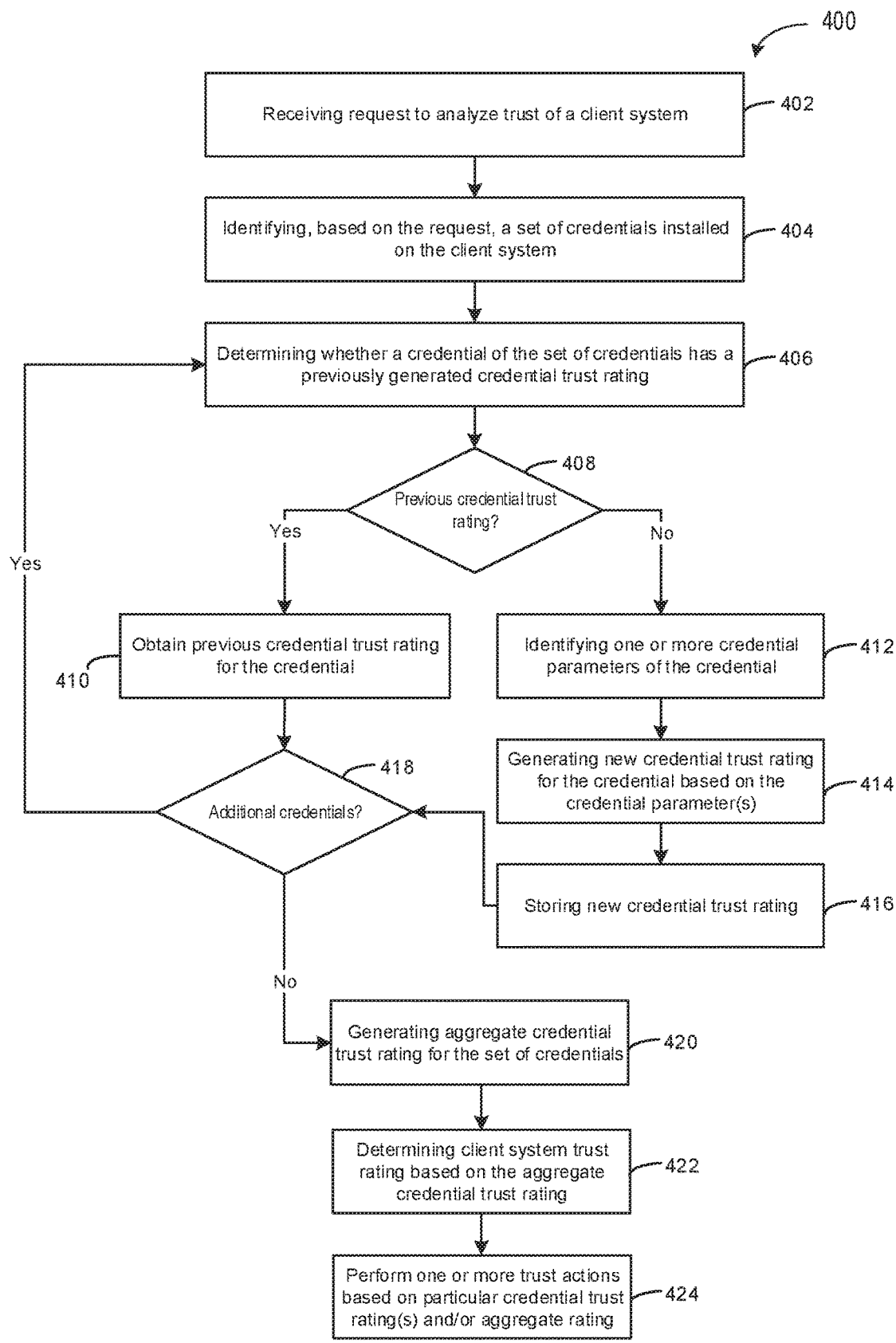
FIG. 4 depicts a flowchart of an example of a method for analyzing trust of a client system or of a user according to some embodiments.

FIG. 4 depicts a flowchart 400 of an example of a method for analyzing trust of a client system according to some embodiments. Although FIG. 4 is being described with reference to generating and responding to a client system trust rating, one skilled in the art would recognize the similar process to generating and respond to a user trust rating, a user group trust rating, etc. In this and other flowcharts, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. It various embodiments, some or all of the steps may be performed by a trust server system (e.g., trust server system 102) and/or a client system (e.g., client system 104).

In step 402, a computing system (e.g., trust server system 102 or client system 104) receives a request to analyze trust of a client system (e.g., client system 104). The request may include a set of identifiers associated with a set of credentials and/or the set of credentials themselves. For example, identifiers may comprise unique IDs or pointers to corresponding credentials stored by the associated client system. In some embodiments, a trust analyzer engine (e.g., trust analyzer engine 204 or trust analyzer client engine 304) receives the request from the client system.

In step 404, the computing system identifies, based on the request, a set of credentials (e.g., credentials 112) installed on the client system. For example, the credentials may be associated with one or more applications (e.g., applications 110) installed local to the client system and/or remote from the client system. In some embodiments, the trust analyzer engine identifies the set of credentials.

In steps 406 and 408, the computing system determines whether a credential of the set of credentials has a previously generated credential trust rating (e.g., a trust rating 224). In some embodiments, the trust analyzer engine determines whether the credential of the set of credentials has a previously generated credential trust rating.

In step 410, the computing system, if it is determined that the credential of the set of credentials has a previously generated credential trust rating, obtains the previously generated credential trust rating. In some embodiments, the trust analyzer engine obtains the previously generated credential trust rating from a datastore (e.g., trust server system datastore 222 or client system datastore 322).

In step 412, the computing system, if it is determined that the credential of the set of credentials does not have a previously generated credential trust rating, identifies one or more credential parameters of the credential. In some embodiments, the trust analyzer engine identifies the one or more credential parameters of the credential.

Figure 5:
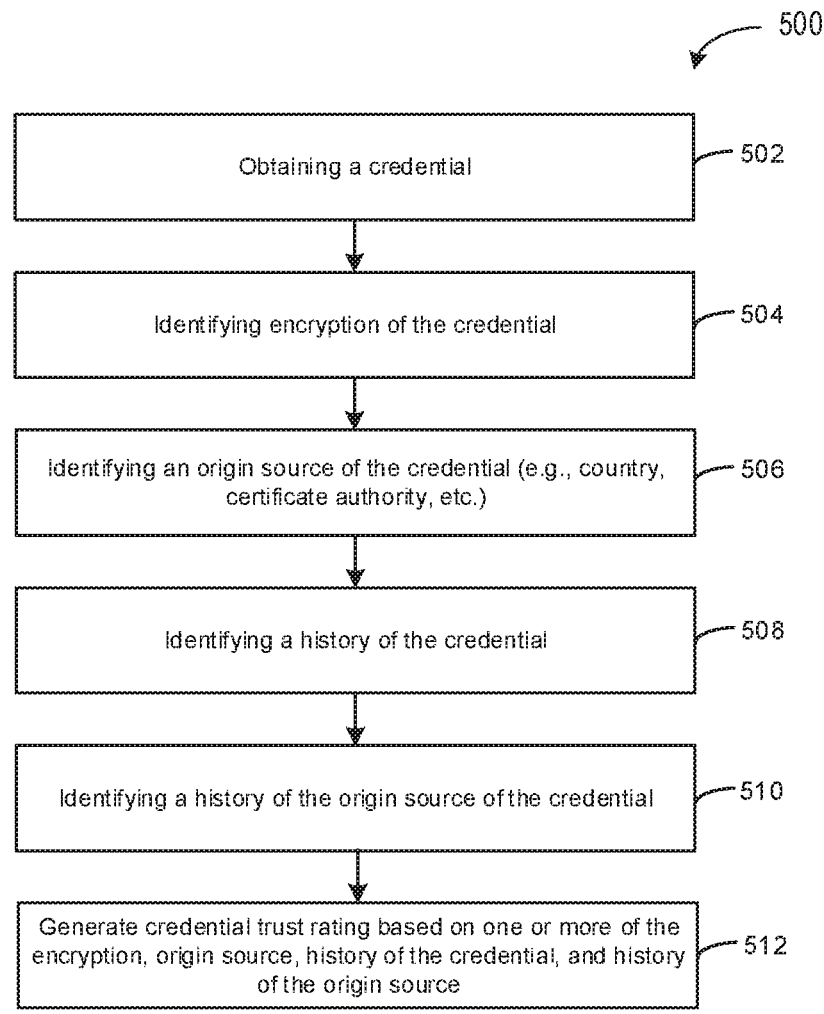
FIG. 5 depicts a flowchart of an example of a method for determining a credential trust rating according to some embodiments.

In step 414, the computing system generates a new credential trust rating for the credential based on at least a portion of the credential parameters. In some embodiments, a trust rating engine (e.g., trust rating engine 206 or trust rating client engine 306) generates the new credential trust rating. An example method of generating the new credential trust rating is shown in FIG. 5.

In step 416, the computing system stores the new credential trust rating. In some embodiments, a management engine (e.g., management engine 202 or management 302) stores the new credential trust rating in a datastore (e.g., trust server system datastore 222 or client system datastore 322).

In step 418, the computing system determines whether there are additional credentials in the set of credentials installed on the client system. If it is determined there are additional credentials in the set of credentials installed on the client system, the method 400 returns to step 406 for analyzing the additional credential. In some embodiments, the trust analyzer engine determines whether there are additional credentials installed on the client system.

In step 420, the computing system, if it determined there are no additional credentials in the set of credentials installed on the client system, generates an aggregate credential trust rating for the set of credentials installed on the client system. For example, the aggregate credential trust rating may be an average, weighted average, or vector of the individual credential trust ratings. The aggregate credential trust rating may be generated based on a trust profile (e.g., trust profile 226). In some embodiments, the trust profile 226 may indicate weighting factors to apply to particular credential trust ratings. For example, the trust profile 226 may indicate that credentials issued from particular credential authority systems (e.g., particular credential authority systems 106), or associated with particular countries or geographic regions, be weighted more heavily. In some embodiments, the trust rating engine generates the aggregate credential trust rating.

In step 422, the computing system determines a client system trust rating based on the aggregate credential trust rating. In other embodiments, the computing system determines the client system trust rating based on the aggregate credential trust rating and one or more other factors (e.g., privacy ratings). For example, the client system trust rating may be an average, a weighted average, or a vector of the aggregate credential trust rating and one or more other factors. The client system trust rating may be generated based on the trust profile. In some embodiments, the trust profile may indicate weighting factors to apply to the aggregate credential trust rating and the one or more other factors. For example, the trust profile may indicate that the aggregate credential trust factor be weighted more heavily than privacy factors. In some embodiments, the trust rating engine generates the client system trust rating.

In step 424, the computing system performs one or trust actions based on the particular credential trust ratings, an aggregate credential trust rating, a client system trust rating, a user trust rating and/or a user group trust rating. Trust actions may include generating a notification (e.g., a graphical, audible, email, text, and/or haptic notification) indicating one or more trust ratings, removing or disabling one or more credentials or applications, performing additional trust and/or privacy scans, and/or the like. In some embodiments, a credential adjustment engine (e.g., credential adjustment engine 214 or credential adjustment engine 314) performs the one or more trust actions.

FIG. 5 depicts a flowchart 500 of an example of a method for determining a credential trust rating according to some embodiments.

In step 502, a computing system (e.g., trust server system 102 or client system 104) obtains a credential (e.g., credential 112). In some embodiments, the computing system obtains the credential from a datastore (e.g., trust server system datastore 222 or client system datastore 322) or other system (e.g., credential authority system 106).

In step 504, the computing system identifies an encryption of the credential. For example, the encryption of the credential may include an encryption level (e.g., 256-bit, 512-bit, and/or the like) or encryption protocol. In some embodiments, a trust analyzer engine (e.g., trust analyzer engine 204 or trust analyzer client engine 304) identifies the encryption of the credential.

In step 506, the computing system identifies an origin source of the credential. For example, the origin source may include the issuing credential authority system (e.g., a credential authority system 106), a country or geographic region associated with the credential and/or issuing credential authority system. In some embodiments, the trust analyzer engine identifies the origin source of the credential.

In step 508, the computing system identifies a history of the credential. For example, the history of the credential may include adverse events associated with the credential, such as known security compromises associated with the credential, date, time, and/or location of the known security compromises, and/or the like. In some embodiments, the trust analyzer engine identifies the history of the credential.

In step 510, the computing system identifies a history of the origin source of the credential. For example, the history of the origin source may include adverse events associated with the origin source, such as known security compromises associated with the origin source, date, time, and/or location of the known security compromises, and/or the like. In some embodiments, the trust analyzer engine identifies the history of the origin source.

In step 512, the computing system generates a credential trust rating for the credential based on one or more of the encryption of the credential, origin source of the credential, history of the credential, and the history of the origin source of the credential. For example, the computing system may determine a corresponding parameter rating to each of the encryption of the credential, origin source of the credential, history of the credential, and the history of the origin source of the credential. The parameter ratings may be determined and/or weighted based on a trust profile (e.g., trust profile 226). For example, the trust profile may indicate particular credential parameters to use when generating the credential rating, and one or more weight factors to apply to some or all of the particular credential parameters.

Figure 6:
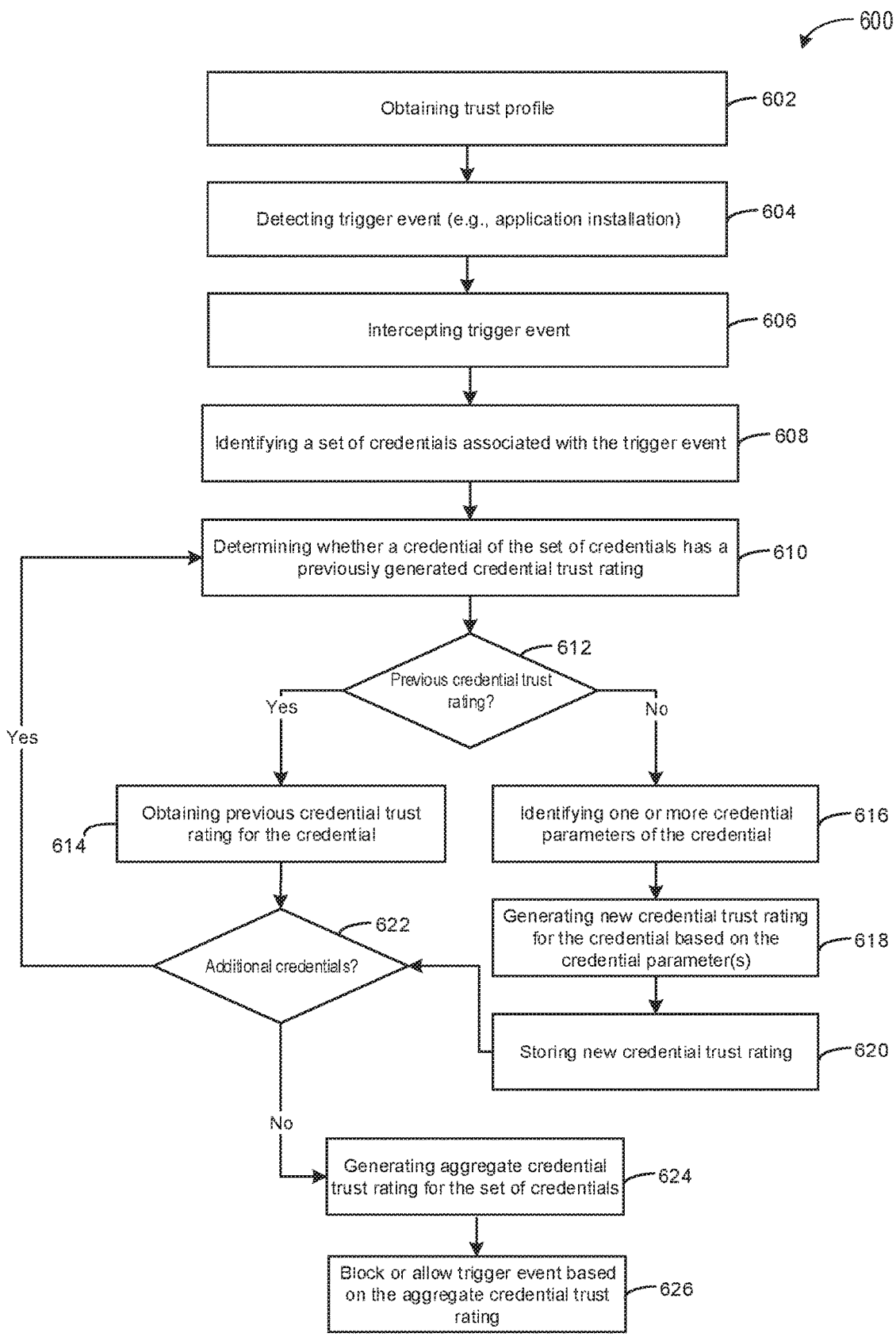
FIG. 6 depicts a flowchart of an example of a method for blocking one or more requests (e.g., a request to install an application on a client system) according to some embodiments.

FIG. 6 depicts a flowchart 600 of an example of a method for blocking or allowing a trigger event on one or more requests (e.g., a request to install an application on a client system) according to some embodiments.

In step 602, a computing system (e.g., trust server system 102 or client system 104) obtains a trust profile (e.g., trust profile 226). In some embodiments, a trust profile engine (e.g., trust profile engine 212 or trust profile client engine 312) obtains the trust profile from a datastore (e.g., trust server system datastore 222 or client system datastore 322).

In step 604, the computing system detects a trigger event. In some embodiments, a request blocking engine (e.g., request blocking engine 216 or request blocking client engine 316) detects the trigger event, e.g., an attempt to install an application, a change to a certificate, a user request, and/or the like.

In step 606, the computing system intercepts the trigger event. In some embodiments, the request blocking engine identifies the trigger event. For example, the request blocking engine may hook into an operating system of the computing system via an API implemented by the request blocking engine.

In step 608, the computing system identifies a set of credentials (e.g., credentials 112) to be installed on the client system in connection with the trigger event. For example, the credentials may be associated with one or more applications (e.g., applications 110) installed local to the client system and/or remote from client system. In some embodiments, the trust analyzer engine identifies the set of credentials.

In steps 610 and 612, the computing system determines whether a credential of the set of credentials has a previously generated credential trust rating (e.g., a trust rating 224). In some embodiments, the trust analyzer engine determines whether the credential of the set of credentials has a previously generated credential trust rating.

In step 614, the computing system, if it is determined that the credential of the set of credentials has a previously generated credential trust rating, obtains the previously generated credential trust rating. In some embodiments, the trust analyzer engine obtains the previously generated credential trust rating from a datastore (e.g., trust server system datastore 222 or client system datastore 322).

In step 616, the computing system, if it is determined that the credential of the set of credentials does not have a previously generated credential trust rating, identifies one or more credential parameters of the credential. In some embodiments, the trust analyzer engine identifies the one or more credential parameters of the credential.

In step 618, the computing system the computing system generates a new credential trust rating for the credential based on at least a portion of the credential parameters. In some embodiments, a trust rating engine (e.g., trust rating engine 206 or trust rating client engine 306) generates the new credential trust rating. An example method of generating the new credential trust rating is shown in FIG. 5.

In step 620, the computing system stores the new credential trust rating. In some embodiments, a management engine (e.g., management engine 202 or management 302) stores the new credential trust rating in a datastore (e.g., trust server system datastore 222 or client system datastore 322).

In step 622, the computing system determines whether there are additional credentials in the set of credentials installed on the client system (or in some embodiments used by the user or group of users, associated with the websites frequented by the user or group of users, and/or the like). If it is determined there are additional credentials in the set of credentials installed on the client system, the method 600 returns to step 610 for analyzing the additional credentials. In some embodiments, the trust analyzer engine determines whether there are additional credentials in the set of credentials installed on the client system.

In step 624, the computing system, if it determined there are no additional credentials in the set of credentials installed on the client system, generates an aggregate credential trust rating for the set of credentials installed on the client system. For example, the aggregate credential trust rating may be an average, a weighted average, or a vector of the individual credential trust ratings. The aggregate credential trust rating may be generated based on a trust profile (e.g., trust profile 226). In some embodiments, the trust profile may indicate weighting factors to apply to particular credential trust ratings. For example, the trust profile also indicate the credentials issued from particular credential authority systems or associated with particular countries or geographic regions be weighted more heavily. In some embodiments, the trust rating engine generates the aggregate credential trust rating (which may be a client system trust rating, user trust rating, user group trust rating, etc.) that may be based on the aggregate trust rating of multiple devices or systems.

In step 626, the computing system blocks or allows the trigger event based on the aggregate credential trust rating and/or user profile. For example, the computing system may compare the aggregate credential trust value with a threshold value or condition, and block or allow the trigger event based on the comparison. The threshold value or condition may be determined based on the trust profile, and/or like other aspects of the trust profiles described herein, may be user created and/or automatically created. In some embodiments, the request blocking engine blocks or allows the trigger event.

Figure 7:
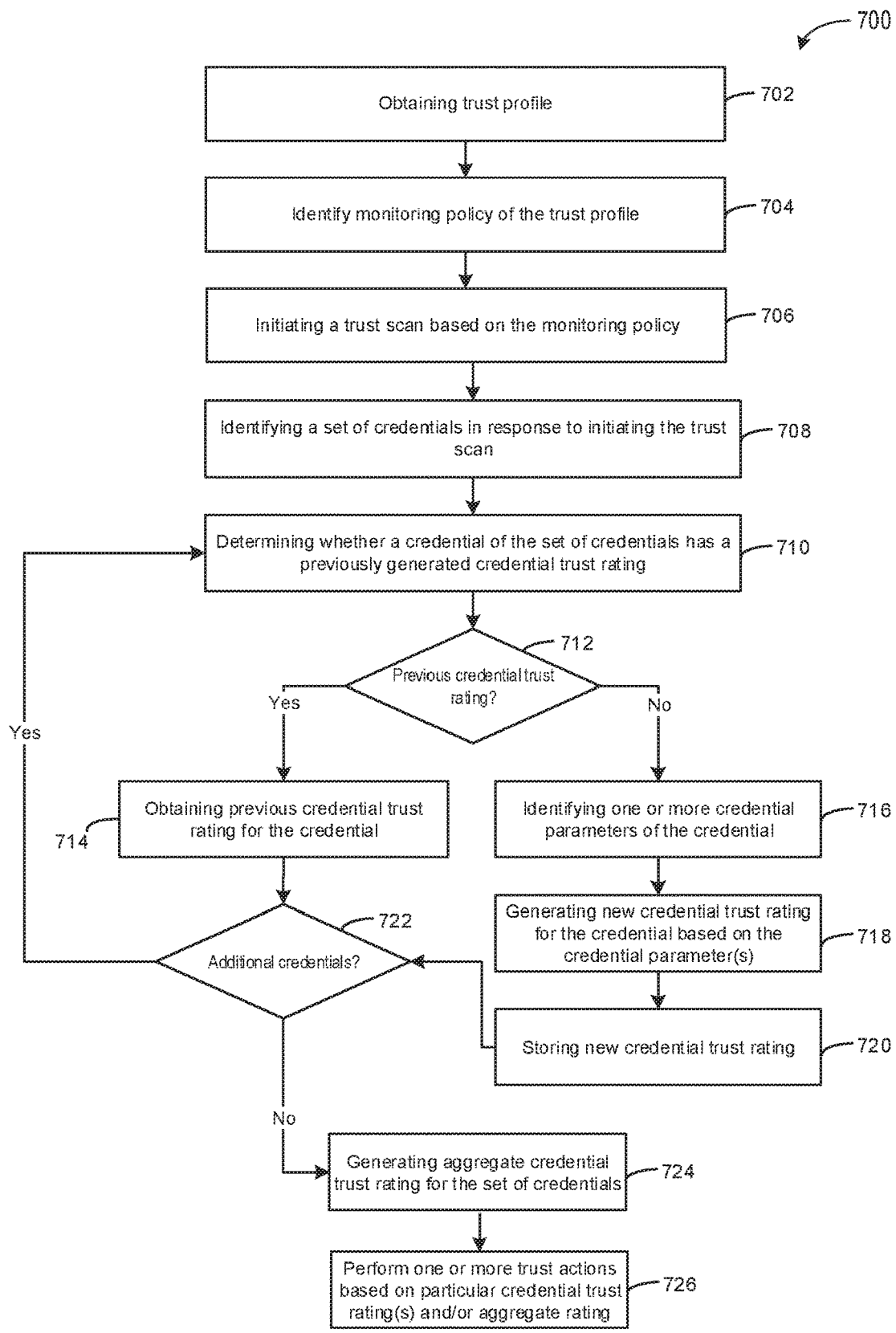
FIG. 7 depicts a flowchart of an example of a method for monitoring trust of a client system according to some embodiments.

FIG. 7 depicts a flowchart 700 of an example of a method for monitoring trust of a client system (or user or group of users) according to some embodiments.

In step 702, a computing system (e.g., trust server system 102 or client system 104) obtains a trust profile (e.g., trust profile 226). In some embodiments, a trust profile engine (e.g., trust profile engine 212 or trust profile client engine 312) obtains the trust profile from a datastore (e.g., trust server system datastore 222 or client system datastore 322).

In step 704, the computing system identifies a monitoring policy of the trust profile. In some embodiments, the trust profile engine identifies the monitoring policy. In step 706, the computing system initiates a trust scan based on the monitoring policy. In some embodiments, a trust monitoring engine (e.g., trust monitoring engine 218 or trust monitoring client engine 318) initiates the trust scan based on the monitory policy.

In step 708, the computing system identifies a set of credentials (e.g., credentials 112) in response to initiation of the trust scan. For example, the credentials may be associated with one or more applications (e.g., applications 110) installed local to the client system and/or remote from client system. In some embodiments, the credentials may be associated with one or more applications (e.g., applications 110) used by a user across the user's multiple devices (whether installed local to the client system and/or remote from client system). In some embodiments, the credentials may be associated with one or more applications (e.g., applications 110) used by a user group across the multiple devices (whether installed local to the client system and/or remote from client system) of the user group. In some embodiments, a trust analyzer engine (e.g., trust analyzer engine 204 or trust analyzer client engine 304) identifies the set of credentials.

In steps 710 and 712, the computing system determines whether a credential of the set of credentials has a previously generated credential trust rating (e.g., a trust rating 224). In some embodiments, the trust analyzer engine determines whether the credential of the set of credentials has a previously generated credential trust rating.

In step 714, the computing system, if it is determined that the credential of the set of credentials has a previously generated credential trust rating, obtains the previously generated credential trust rating. In some embodiments, the trust analyzer engine obtains the previously generated credential trust rating from a datastore (e.g., trust server system datastore 222 or client system datastore 322).

In step 716, the computing system, if it is determined that the credential of the set of credentials does not have a previously generated credential trust rating, identifies one or more credential parameters of the credential. In some embodiments, the trust analyzer engine identifies the one or more credential parameters of the credential.

In step 718, the computing system generates a new credential trust rating for the credential based on at least a portion of the credential parameters. In some embodiments, a trust rating engine (e.g., trust rating engine 206 or trust rating client engine 306) generates the new credential trust rating. An example method of generating the new credential trust rating is shown in FIG. 5.

In step 720, the computing system stores the new credential trust rating. In some embodiments, a management engine (e.g., management engine 202 or management 302) stores the new credential trust rating in a datastore (e.g., trust server system datastore 222 or client system datastore 322).

In step 722, the computing system determines whether there are additional credentials in the set of credentials to review (e.g., installed on the client system, across client systems of the user, across client systems of the user group, etc.). If it is determined there are additional credentials in the set of credentials to review, the method 700 returns to step 710 for analyzing the additional credential. In some embodiments, the trust analyzer engine determines whether there are additional credentials in the set of credentials to review.

In step 724, the computing system the computing system, if it determined there are no additional credentials in the set of credentials to review, generates an aggregate credential trust rating for the set of credentials. For example, aggregate credential trust rating may be an average, a weighted average, or a vector of the individual credential trust ratings. The aggregate credential trust rating may be generated based on a trust profile (e.g., trust profile 226). In some embodiments, the trust profile may indicate weighting factors to apply to particular credential trust ratings. For example, the trust profile also indicate the credentials issued from particular credential authority systems or associated with particular countries or geographic regions be weighted more heavily. In some embodiments, the trust rating engine generates the aggregate credential trust rating.

In step 726, the computing system performs one or trust actions based on particular credential trust ratings, the aggregate credential trust rating, client system trust rating, user trust rating, and/or user group trust rating. In some embodiments, a credential adjustment engine (e.g., credential adjustment engine 214 or credential adjustment engine 314) performs the one or more trust actions.

Figure 8:
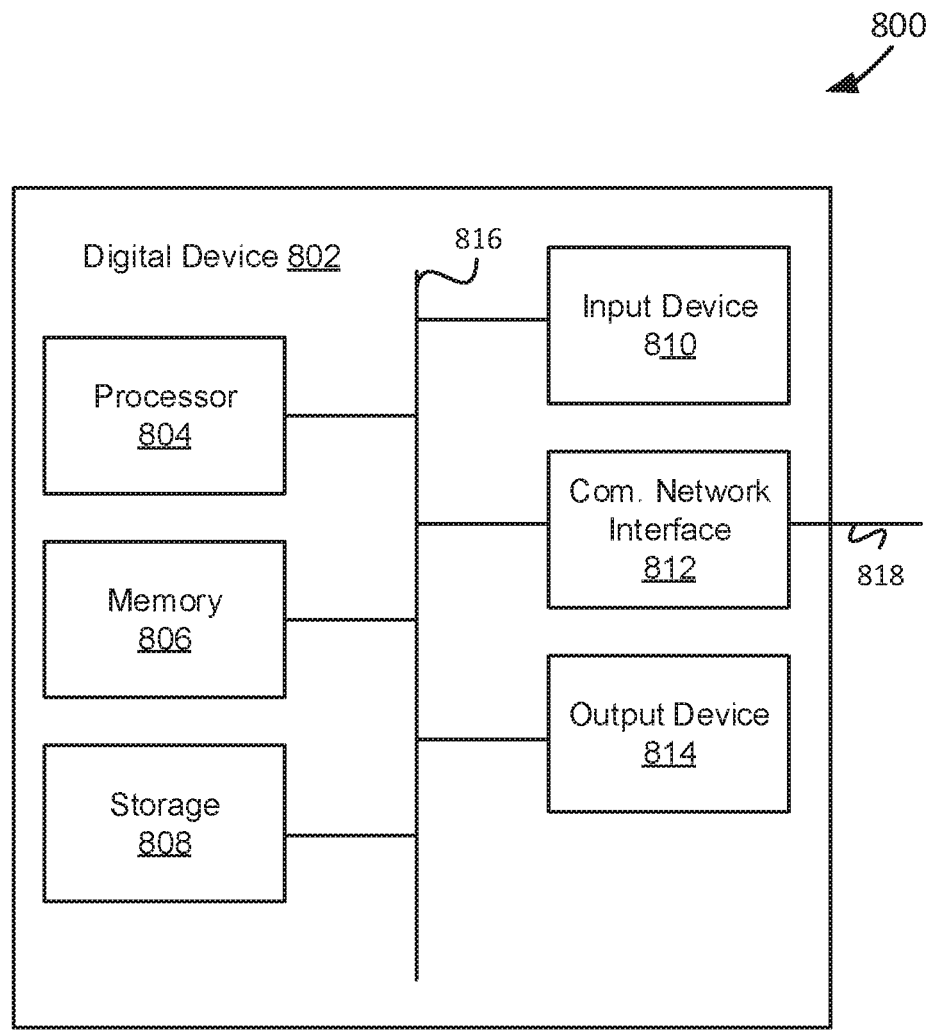
FIG. 8 depicts a diagram of an example of a computer system which may be specifically configured to implement any of the embodiments described herein.

FIG. 8 depicts a diagram 800 of an example of a computing device 802. Any of the trust server system 102, the client systems 104, the credential authority systems 106, and the communication network 108 may comprise an instance of one or more computing devices 802. The computing device 802 comprises a processor 804, memory 806, storage 808, an input device 810, a communication network interface 812, and an output device 814 communicatively coupled to a communication channel 816. The processor 804 is configured to execute executable instructions (e.g., programs). In some embodiments, the processor 804 comprises circuitry or any processor capable of processing the executable instructions.

The memory 806 stores data. Some examples of memory 806 include storage devices, such as RAM, ROM, RAM cache, virtual memory, etc. In various embodiments, working data is stored within the memory 806. The data within the memory 806 may be cleared or ultimately transferred to the storage 808.

The storage 808 includes any storage configured to retrieve and store data. Some examples of the storage 808 include flash drives, hard drives, optical drives, cloud storage, and/or magnetic tape. Each of the memory system 806 and the storage system 808 comprises a computer-readable medium, which stores instructions or programs executable by processor 804.

The input device 810 is any device that inputs data (e.g., mouse and keyboard). The output device 814 outputs data (e.g., a speaker or display). It will be appreciated that the storage 808, input device 810, and output device 814 may be optional. For example, the routers/switchers may comprise the processor 804 and memory 806 as well as a device to receive and output data (e.g., the communication network interface 812 and/or the output device 814).

The communication network interface 812 may be coupled to a network (e.g., network 108) via the link 818. The communication network interface 812 may support communication over an Ethernet connection, a serial connection, a parallel connection, and/or an ATA connection. The communication network interface 812 may also support wireless communication (e.g., 802.11 a/b/g/n, WiMax, LTE, WiFi). It will be apparent that the communication network interface 812 may support many wired and wireless standards.

It will be appreciated that the hardware elements of the computing device 802 are not limited to those depicted in FIG. 8. A computing device 802 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 804 and/or a co-processor located on a GPU (i.e., NVidia).

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A system comprising:
   one or more processors; and
   memory storing instructions that, when executed by the one or more processors, cause the system to perform:
   receiving a request to analyze trust of a client system;
   identifying, based on the request, a set of digital certificates installed on the client system;
   for each digital certificate of the set of digital certificates identified based on the request:
   (i) determining whether the digital certificate has a previously generated digital certificate trust rating;
   (ii) if at least a determination is made that the digital certificate does not have a previously generated digital certificate trust rating, then
   (1) identifying digital certificate parameters of the digital certificate, the digital certificate parameters including at least an encryption parameter, a certifying authority parameter, and at least one of a parameter associated with a history of adverse events associated with the digital certificate or a parameter associated with a history of adverse events associated with an issuer of the digital certificate; and
   (2) generating a new digital certificate trust rating for the digital certificate based on a respective level of trust risk associated with each digital certificate parameter of the digital certificate parameters;
   (iii) if at least a determination is made that the digital certificate has a previously generated trust rating, then retrieving the previously generated digital certificate trust rating for the digital certificate from a datastore;
   generating a first aggregate digital certificate trust rating based on any of the new digital certificate trust ratings and the previously generated digital certificate trust ratings for the set of digital certificates installed on the client system; and
   establishing a mapping between an application or website and one or more digital certificates of the set of digital certificates installed on the client system.

2. The system of claim 1, wherein the instructions further cause the system to perform:
   determining a client system trust rating of the client system based on the first aggregate digital certificate trust rating;
   comparing the first aggregate digital certificate trust rating with a threshold value; and
   performing one or more trust actions based on the comparison.

3. The system of claim 2, wherein the one or more trust actions include any of generating an alert indicating the client system trust rating, removing at least one digital certificate of the set of digital certificates, disabling at least one digital certificate of the set of digital certificates, or disabling an application that is using at least one digital certificate of the set of digital certificates.

4. The system of claim 1, wherein the instructions further cause the system to perform:
   comparing each of the digital certificate trust ratings with a threshold value; and
   performing one or more trust actions based on the comparison.

5. The system of claim 4, wherein the one or more trust actions include any of generating an alert indicating at least one of the digital certificate trust ratings, removing at least one digital certificate of the set of digital certificates, disabling at least one digital certificate of the set of digital certificates, or disabling an application that is using at least one digital certificate of the set of digital certificates.

6. The system of claim 1, wherein the instructions further cause the system to perform:
detecting a trigger event;
intercepting the trigger event;
identifying a second set of digital certificates associated with the trigger event;
for each digital certificate of the second set of digital certificates:
(i) determining whether the digital certificate has a previously generated digital certificate trust rating;
(ii) if at least a determination is made that the digital certificate does not have a previously generated digital certificate trust rating, then
(1) identifying digital certificate parameters of the digital certificate; and
(2) generating a new digital certificate trust rating for the digital certificate based on a respective level of trust risk associated with each digital certificate parameter of the digital certificate parameters;
(iii) if at least a determination is made that the digital certificate has a previously generated digital certificate trust rating, then retrieving the previously generated digital certificate trust rating for the digital certificate from a datastore;
generating a second aggregate digital certificate trust rating based on any of the new digital certificate trust ratings and the previously generated digital certificate trust ratings for the second set of digital certificates associated with the trigger event; and
performing a trust action based on the second aggregate digital certificate trust rating.

7. The system of claim 6, wherein the trigger event comprises a request to install an application on the client system, and the trust action comprises blocking the request to install the application on the client system or allowing the request to install the application on the client system.

8. The system of claim 6, wherein the second digital certificate trust rating is generated based on a trust profile.

9. The system of claim 1, wherein the instructions further cause the system to perform:
generating a second aggregate digital certificate trust rating for a second set of digital certificates installed on a second client system;
generating a user trust rating based on the first aggregate digital certificate trust rating and the second aggregate digital certificate trust rating; and
performing a trust action based on the user trust rating.

10. The system of claim 1, wherein the instructions further cause the system to perform:
detecting a change to one or more digital certificates of the set of digital certificates; and
generating an alert indicating the change to the one or more digital certificates of the set of digital certificates.

11. A method implemented by a computing system including one or more physical processors and storage media storing machine-readable instructions, the method comprising:
receiving a request to analyze trust of a client system;
identifying, based on the request, a set of digital certificates installed on the client system;
for each digital certificate of the set of digital certificates identified based on the request:
(i) determining whether the digital certificate has a previously generated digital certificate trust rating;
(ii) if at least a determination is made that the digital certificate does not have a previously generated digital certificate trust rating, then
(1) identifying digital certificate parameters of the digital certificate, the digital certificate parameters including at least an encryption parameter, a certifying authority parameter, and at least one of a parameter associated with a history of adverse events associated with the digital certificate or a parameter associated with a history of adverse events associated with an issuer of the digital certificate; and
(2) generating a new digital certificate trust rating for the digital certificate based on a respective level of trust risk associated with each digital certificate parameter of the digital certificate parameters;
(iii) if at least a determination is made that the digital certificate has a previously generated trust rating, then retrieving the previously generated digital certificate trust rating for the digital certificate from a datastore;
generating a first aggregate digital certificate trust rating based on any of the new digital certificate trust ratings and the previously generated digital certificate trust ratings for the set of digital certificates installed on the client system; and
establishing a mapping between an application or website and one or more digital certificates of the set of digital certificates installed on the client system.

12. The method of claim 11, further comprising:
determining a client system trust rating of the client system based on the first aggregate digital certificate trust rating;
comparing the first aggregate digital certificate trust rating with a threshold value; and
performing one or more trust actions based on the comparison.

13. The method of claim 12, wherein the one or more trust actions include any of generating an alert indicating the client system trust rating, removing at least one digital certificate of the set of digital certificates, disabling at least one digital certificate of the set of digital certificates, or disabling an application that is using at least one digital certificate of the set of digital certificates.

14. The method of claim 11, further comprising:
comparing each of the digital certificate trust ratings with a threshold value; and
performing one or more trust actions based on the comparison.

15. The method of claim 14, wherein the one or more trust actions include any of generating an alert indicating at least one of the digital certificate trust ratings, removing at least one digital certificate of the set of digital certificates, disabling at least one digital certificate of the set of digital certificates, or disabling an application that is using at least one digital certificate of the set of digital certificates.

16. The method of claim 11, further comprising:
detecting a trigger event;
intercepting the trigger event;
identifying a second set of digital certificates associated with the trigger event;
for each digital certificate of the second set of digital certificates:
(i) determining whether the digital certificate has a previously generated digital certificate trust rating;

(ii) if at least a determination is made that the digital certificate does not have a previously generated digital certificate trust rating, then
  (1) identifying digital certificate parameters of the digital certificate; and
  (2) generating a new digital certificate trust rating for the digital certificate based on a respective level of trust risk associated with each digital certificate parameter of the digital certificate parameters;
(iii) if at least a determination is made that the digital certificate has a previously generated trust rating, then retrieving the previously generated digital certificate trust rating for the digital certificate from a datastore;
generating a second aggregate digital certificate trust rating based on any of the new digital certificate trust ratings and the previously generated digital certificate trust ratings for the second set of digital certificates associated with the trigger event; and
performing a trust action based on the second aggregate digital certificate trust rating.

17. The method of claim 16, wherein the trigger event comprises a request to install an application on the client system, and the trust action comprises blocking the request to install the application on the client system or allowing the request to install the application on the client system.

18. The method of claim 11, further comprising:
detecting a change to one or more digital certificates of the set of digital certificates; and
generating an alert indicating the change to the one or more digital certificates of the set of digital certificates.

19. A non-transitory computer readable medium comprising instructions that, when executed, cause one or more processors to perform:
receiving a request to analyze trust of a client system;
identifying, based on the request, a set of digital certificates installed on the client system;
for each digital certificate of the set of digital certificates identified based on the request:
  (i) determining whether the digital certificate has a previously generated digital certificate trust rating;
  (ii) if at least a determination is made that the digital certificate does not have a previously generated digital certificate trust rating, then
    (1) identifying digital certificate parameters of the digital certificate, the digital certificate parameters including at least an encryption parameter, a certifying authority parameter, and at least one of a parameter associated with a history of adverse events associated with the digital certificate or a parameter associated with a history of adverse events associated with an issuer of the digital certificate; and
    (2) generating a new digital certificate trust rating for the digital certificate based on a respective level of trust risk associated with each digital certificate parameter of the digital certificate parameters;
  (iii) if at least a determination is made that the digital certificate has a previously generated trust rating, then retrieving the previously generated digital certificate trust rating for the digital certificate from a datastore;
generating an aggregate digital certificate trust rating based on any of the new digital certificate trust ratings and the previously generated digital certificate trust ratings for the set of digital certificates installed on the client system; and
establishing a mapping between an application or website and one or more digital certificates of the set of digital certificates installed on the client system.

* * * * *